(12) United States Patent
Richardson

(10) Patent No.: US 6,995,976 B2
(45) Date of Patent: Feb. 7, 2006

(54) PROTECTIVE MEMBRANE FOR TOUCH SCREEN DEVICE

(75) Inventor: Curtis R. Richardson, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 10/645,439

(22) Filed: Aug. 20, 2003

(65) Prior Publication Data

US 2004/0112143 A1 Jun. 17, 2004

Related U.S. Application Data

(63) Continuation of application No. 10/300,200, filed on Nov. 19, 2002, now Pat. No. 6,646,864.

(60) Provisional application No. 60/335,865, filed on Nov. 19, 2001.

(51) Int. Cl.
G06F 1/16 (2006.01)
(52) U.S. Cl. .................... 361/681; 361/683; 220/23.91
(58) Field of Classification Search ................ 150/165; 455/550.1, 556.1, 556.2, 575.1, 575.8, 90.3; 361/681–683; 379/433.01; 220/23.91
See application file for complete search history.

(56) References Cited

U.S. PATENT DOCUMENTS

| D216,853 S | 3/1970 | Schurman |
|---|---|---|
| D220,233 S | 3/1971 | Schurman |
| D275,822 S | 10/1984 | Gatland et al. |
| D327,646 S | 7/1992 | Hardigg et al. |
| D329,747 S | 9/1992 | Embree |
| D330,329 S | 10/1992 | Brightbill |
| 6,388,877 B1 | 12/1992 | Canova |
| D335,220 S | 5/1993 | Ward et al. |
| D342,609 S | 12/1993 | Brightbill |
| D347,324 S | 5/1994 | Dickenson |
| D347,732 S | 6/1994 | Wentz |
| D353,048 S | 12/1994 | VanSkiver et al. |
| D381,512 S | 7/1997 | Green |
| D386,611 S | 11/1997 | Sheu |
| D402,105 S | 12/1998 | Erickson |
| D409,374 S | 5/1999 | Laba et al. |
| D412,062 S | 7/1999 | Potter et al. |
| D413,202 S | 8/1999 | Schmitt et al. |
| D413,203 S | 8/1999 | Zurwelle et al. |
| D419,297 S | 1/2000 | Richardson et al. |
| D419,767 S | 2/2000 | Richardson et al. |
| D419,768 S | 2/2000 | Richardson et al. |
| D423,772 S | 5/2000 | Cooper et al. |
| 6,068,119 A * | 5/2000 | Derr et al. .................. 206/305 |
| D429,884 S | 8/2000 | Zurwelle et al. |
| 6,094,785 A * | 8/2000 | Montgomery et al. ........ 24/324 |
| D433,798 S | 11/2000 | Weinstock |
| D439,407 S | 3/2001 | Parker |
| D441,954 S | 5/2001 | Parker |
| D443,133 S | 6/2001 | Richardson et al. |

(Continued)

Primary Examiner—Anatoly Vortman
Assistant Examiner—Anthony Q. Edwards
(74) Attorney, Agent, or Firm—Cochran Freund & Young LLC; William W. Cochran

(57) ABSTRACT

A protective membrane is disclosed for an electronic device that has a touch screen. The touch screen is protected with a membrane adapted to the specific contour and profile of the electronic device and allows the user to use the touch screen interface with no shortcomings. The protective case is further adapted to allow infrared and other communication signals while the device is secured inside the case. Further, electrical connections can be made through the case without affecting the protection afforded the electronic device inside.

18 Claims, 12 Drawing Sheets

U.S. PATENT DOCUMENTS

| | | |
|---|---|---|
| 6,317,313 B1 | 11/2001 | Mosgrove et al. |
| 6,396,769 B1 | 5/2002 | Polany |
| 6,415,138 B2 * | 7/2002 | Sirola et al. ............... 455/90.1 |
| 6,456,487 B1 * | 9/2002 | Hetterick .................... 361/683 |
| D464,196 S | 10/2002 | Parker |
| 6,471,056 B1 * | 10/2002 | Tzeng ....................... 206/320 |
| D465,330 S | 11/2002 | Parker |
| D470,659 S | 2/2003 | Story et al. |
| 6,536,589 B2 * | 3/2003 | Chang ....................... 206/320 |
| D472,384 S | 4/2003 | Richardson |
| 6,614,722 B2 | 9/2003 | Polany et al. |
| 6,646,864 B2 | 11/2003 | Richardson et al. |
| 6,665,174 B1 * | 12/2003 | Derr et al. .................. 361/681 |
| 6,698,608 B2 * | 3/2004 | Parker et al. .............. 220/4.22 |
| 2004/0120219 A1 | 6/2004 | Polany et al. |

\* cited by examiner

PROTECTIVE MEMBRANE FOR TOUCH SCREEN DEVICE

CROSS REFERENCE TO RELATED APPLICATIONS

This application is a continuation of U.S. patent application Ser. No. 10/300,200 entitled "Protective Case for Touch Screen Device" by Curtis R. Richardson, filed Nov. 19, 2002, now U.S. Pat. No. 6,646,864 which claims the benefit of and priority to U.S. Provisional Patent Application Ser. No. 60/335,865 filed Nov. 19, 2001 by Curtis R. Richardson entitled "Protective Case for Touch Screen Device," the entire contents of both applications are hereby specifically incorporated herein by reference for all they disclose and teach.

BACKGROUND OF THE INVENTION a. Field of the Invention

The present invention pertains generally to protective cases and specifically to protective cases for devices that have a touch screen interface.

b. Description of the Background

Personal Digital Assistants, or PDAs are being very widely used, and are being deployed in industrial as well as office environments. PDAs are being used in industrial environments for data collection, such as service information on an airplane, or for data delivery such as maps for fire fighters and other emergency personnel. When PDAs are deployed in such industrial applications, the data that is collected and displayed on the PDA can be extremely valuable and can be life saving.

The industrial environments impose harsh conditions that typical PDAs are not designed to accommodate. For example, damage can be done to the PDA through rough handling and dropping. Further, industrial chemicals, grease, water, dirt, and grime may damage or destroy a functioning PDA and inhibit the use of the PDAs valuable data.

It is common to hold the PDAs inside a protective case for transport. However, in the case of a firefighter using the PDA on a fire scene, opening a case with gloved hands in the midst of fighting a fire exposes the PDA to easily being dropped, getting wet, or otherwise being damaged.

The user interface for PDAs are typically a few buttons and a touch screen display. The touch screen is used to both display information and to capture information. The data capture generally uses a stylus to select buttons or areas on the screen for certain functions, draw shapes onto the screen, use character recognition to enter text or numbers, or other methods of data capture.

The PDA may be connected to another computer by several mechanisms. The PDA may be direct connected using a wire connection, wherein a cable with a connector physically connects to the PDA. A second method is to use an infrared communication protocol that uses an infrared transmitter and receiver mounted in the PDA to communicate with another computer having a similar transceiver. A third method is to communicate via radio signals such as a cellular phone protocol or wireless modem.

It would therefore be advantageous to provide a case for a PDA wherein the PDA may be fully operated when the PDA is stored securely in the case. Further, the operation of the PDA through its touch screen interface should not be hindered by a protective case. The case would also not interfere with the connections between the PDA and another computer.

SUMMARY OF THE INVENTION

The present invention overcomes the disadvantages and limitations of the prior art by providing a protective case whereby a touch screen display may be viewed and manipulated without impeding the performance of the display and for use while the device is protected by the case. The touch screen interface is comprised of a semi rigid translucent or at least partially transparent material that is stiff enough and smooth enough for the stylus to move over the surface of the material without digging into the surface of the material and still being flexible enough so that the touch screen may be operated.

Further, the present invention may allow infrared and other types of communications between a device inside the case and an external electronic device while the device is maintained in the protective case. The present invention also may allow for optional direct electrical connections to be made through the case without having to open the case. Additionally, pass-throughs for light, acoustics, heat, mechanical actuation, etc. may also be provided.

The present invention may further comprise a belt clip for holding the case on a person's belt. The belt clip may be designed so that the touch screen interface is oriented toward the user's body for optimal protection from damage.

The present invention may therefore comprise a protective membrane for a touch screen comprising: a recessed area disposed over the touch screen, the recessed area being at least partially transparent; the surface finish having a predetermined smoothness; the recessed area having a predetermined thickness; the recessed area having a predetermined stiffness; the predetermined smoothness, the predetermined thickness, and the predetermined stiffness being selected such that simultaneous pressing and sliding of a stylus over the recessed area creates a tactile input to the touch screen.

The present invention may further comprise a protective cover that protects a touch screen on an electronic device and allows sliding tactile input to the touch screen comprising: a protective enclosure that attaches to said electronic device; a protective membrane that is attached to the protective enclosure comprising: a recessed area disposed over the touch screen, the recessed area being at least partially transparent; the recessed area having a surface finish with a predetermined smoothness; the recessed area having a predetermined thickness; the recessed area having a predetermined stiffness; the predetermined smoothness, said predetermined thickness, and said predetermined stiffness being selected such that simultaneous pressing and sliding of a stylus over the recessed area is sufficient to create a tactile input to the touch screen.

The advantages of the present invention are that PDAs and other electronic devices having touch screens may be used in the most severe operating environments without damage. Further, various functions of the electronic devices may be available to the user, including portability, direct electrical connection, infrared transmit and receive, radio transmit and receive, direct operation of every button, and full viewing and manipulation of the touch screen interface.

DETAILED DESCRIPTION OF THE INVENTION

Figure 1:
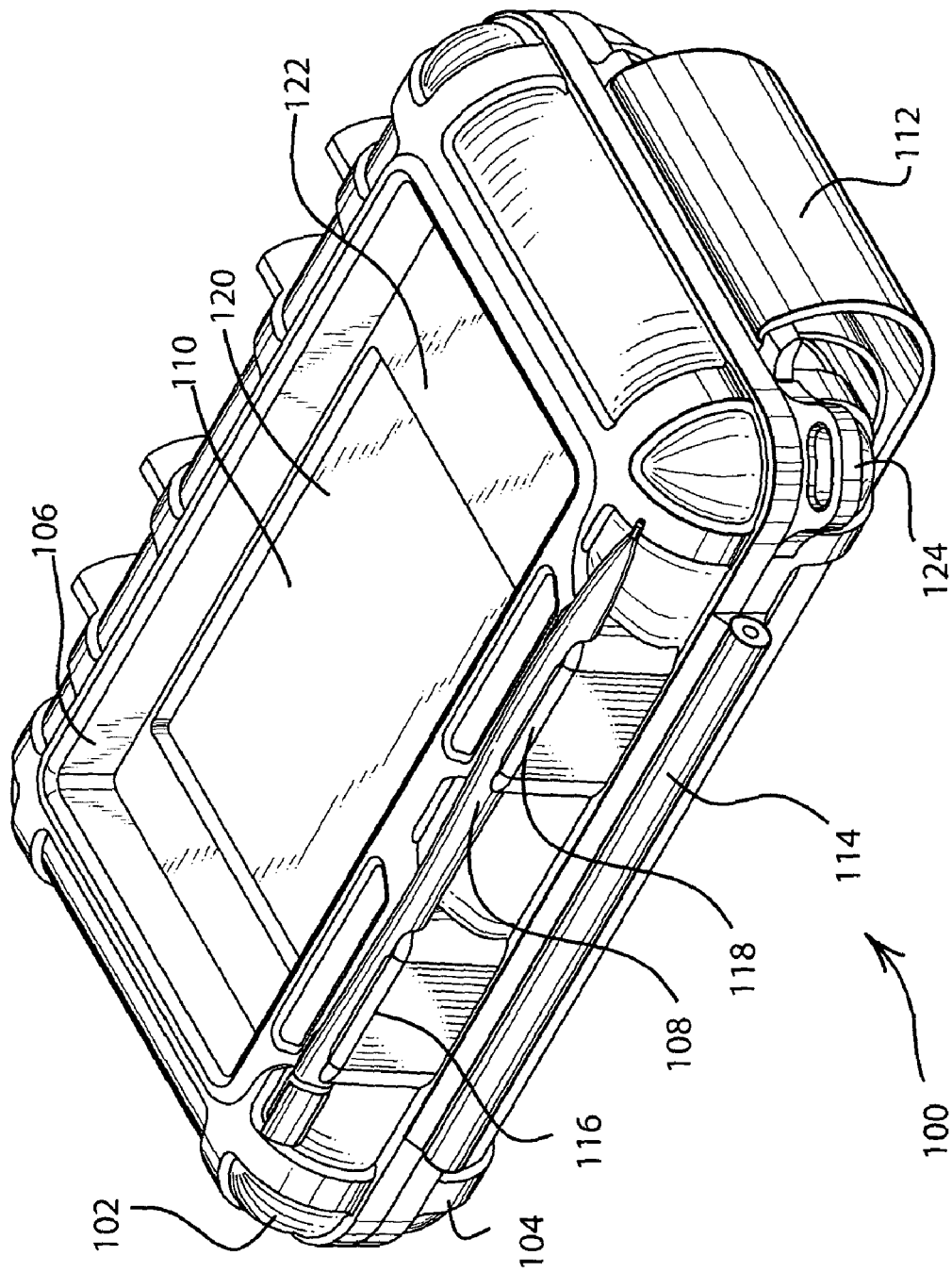
FIG. 1 is a perspective view of an embodiment of the invention shown in the closed position.

FIG. 1 is a perspective view of an embodiment of the invention. Embodiment 100 comprises a rigidly molded front case 102 and rear case 104. An overmolded grommet 106 forms a receptacle for stylus 108 and also aids in sealing membrane 110. A flexible hand strap 112 attaches to the rear case 104. A hinge 114 joins front case 102 and rear case 104. A ring 124 for a lanyard is shown as an integral feature of rear case 104.

Embodiment 100 is designed to hold a conventional personal digital assistant (PDA) in a protective case. A PDA, such as a Palm Pilot, Handspring Visor, Compaq Ipaq, Hewlett Packard Jornada, or similar products use a touch screen for display and data entry. The touch screen display comprises either a color or black and white liquid crystal display with a touch sensitive device mounted on top of the display. The display is used for displaying graphics, text, and other elements to the user. The touch screen is used with a stylus 108 to select elements from the screen, to draw figures, and to enter text with a character recognition program in the PDA. The stylus 108 generally resembles a conventional writing implement however, the tip of the writing implement is a rounded plastic tip. In place of a stylus 108, the user may use the tip of a finger or fingernail, or a conventional pen or pencil. When a conventional writing implement is used, damage to the touch screen element may occur, such as scratches.

For the purposes of this specification, the term PDA shall include any electronic device that has a touch screen interface. This may include instruments such as voltmeters, oscilloscopes, logic analyzers, and any other hand held, bench top, or rack mounted instrument that has a touch screen interface. Hand held devices, such as cell phones, satellite phones, telemetric devices, and other hand held devices are also to be classified as PDAs for the purposes of this specification. The term PDA shall also include any computer terminal display that has a touch screen interface. These may comprise kiosks, outdoor terminal interfaces, industrial computer interfaces, commercial computer interfaces, and other computer displays. Additionally, the term PDA may comprise barcode scanners, hand held GPS receivers, and other handheld electronic devices. The foregoing description of the term PDA has been presented for purposes of illustration and description. It is not intended to be exhaustive or to limit the invention to the precise forms disclosed, and other modifications and variations may be possible in light of the teachings of this specification.

In addition, the PDAs typically have a handful of additional buttons as part of the user interface. These buttons are generally on the front of the device, near the touch screen element. The additional buttons may be used as shortcut buttons to instantly call up a certain program on the PDA, may comprise a method of scrolling, may be used to select items from a list, or may have any function that the designer of the PDA software may assign to the button or set of buttons. The button size, layout, and function may vary for each manufacturer and model of PDA.

Further, PDAs typically have at least one method of connecting to another computer. This may be through a direct electrical connection, such as through a wire cable or fiber optic, or through another medium such as infrared communication or through a radio communication.

Additionally, the PDAs typically have an electrical source. The electrical source may be a rechargeable or non-rechargeable battery or solar cells. The electrical source may be a remote source of electricity that is transmitted to the PDA through a wire cable or through other methods of electrical transmission.

Further, PDAs may have indicator lights, such as status lights for power, communication, battery status, or other functions. The lights may be located on any of the sides of the PDA and may be viewable on one or more sides.

Front case 102 and rear case 104 form a protective cover for the PDA. The protective cover may be designed for rugged industrial use, recreational use, commercial use, or many other uses. An industrial use may require the protective cover to be watertight, chemically resistant, protect the unit when dropped, and be crush proof. A typical application may be for fire fighters to use a PDA for a display of maps for directions to an emergency scene or for a building plan at the scene of a fire. Another example may be a maintenance mechanic in a chemical plant using a PDA to record maintenance records in the plant that processes. A recreational use may require the cover to be watertight, afford some protection against dropping and being crushed, float in water, and be dust resistant. A recreational use may be to take the PDA during kayaking, diving, or other water sport activity. Further, the case may be used when the PDA is taken camping, hiking, or other outdoor activity. A commercial use may additionally require the protective cover to be elegant, but may also require the cover to be replaceable so that scratches and other signs of wear and tear can be easily and cheaply replaced.

The protective cover for the PDA may take on many embodiments. The embodiment 100 comprises a front case 102 and rear case 104 that are joined by a hinge 114 and a clasp mechanism that is on the side of the cases opposite the hinge 114. Other embodiments may have a small door into which the PDA slides, or the protective cover may not completely enclose the PDA and only cover the face where the user interface exists, leaving one or more sides of the PDA exposed. Those skilled in the art may use other designs of protective covers without deviating from the scope and intent of the present invention.

The protective cover may be constructed of rigid plastic, metal, flexible rubber, or any other type of material that could be adapted to afford the protection of the PDA desired for the application. For example, a metal cover may be used in an application where an elegant style is necessary but watertightness is not. A flexible rubber cover may be selected for an application in a wet environment. A rigid plastic cover may be selected for an application where dropping the PDA is a concern. Those skilled in the art may use other types of materials and constructions without deviating from the spirit of the present invention.

The PDA may be mounted in the protective cover using many different mounting techniques. For example, the PDA may be mounted using open or closed cell foam inserts in the protective cover. In another embodiment, the PDA may be mounted by attaching the PDA to the cover with a fastener. In another embodiment, the PDA may be mounted by snapping into the protective waterproof cover. In another embodiment, the PDA may be held in place by resting in molded features of two halves of a protective case that clamps onto the PDA. Those skilled in the art may use other types of locating and holding mechanisms without deviating from the spirit of the present invention.

The overmolded grommet 106 of the present embodiment is constructed by injection molding a thermoplastic polymerized rubber (TPR) over the front case 102. The grommet 106 has molded features 116 and 118 adapted to retain the stylus 108. Features 116 and 118 capture the stylus 108 during transportation, but allow the user to remove the stylus 108 to operate the PDA. In other embodiments of the present invention, the stylus 108 may be constrained to the PDA with a tether or lanyard, or the constraining features may be incorporated into other components that make up the protective cover. Further, the stylus 108 may not be present in the embodiment, rather that the PDA be adapted to be used with the user's fingernail or with another implement similar to the stylus 108.

The membrane 110 of the present embodiment is constructed by thermoforming a sheet of thin plastic. The plastic is selected to be thin enough that the deformation of a stylus conducts the touch to the touch screen, but thick enough to have enough rigidity that the stylus does not catch and rip the membrane. Additionally, the membrane 110 should have enough thickness to endure scratches and other wear and tear without breaking and sacrificing the protective function. Polyvinylchoride material at 0.010 in to 0.015 in thickness gives acceptable results. Alternatively, membrane 110 may be constructed by injection molding or other methods. Alternative materials may be used by those skilled in the art to achieve the same results while maintaining within the spirit and intent of the present invention.

The membrane 110 in the present embodiment may be translucent or at least partially transparent, so that the images displayed on the PDA may be visible through the membrane 110. The membrane 110 may be tinted or colorized in some applications. For example, a protective cover designed as a decorative cover may incorporate a colorized membrane 110. Further, the membrane may be selectively colorized and the opaqueness may vary. For example, the protective membrane may be printed or painted in the areas not used for the touch screen. A printing process may incorporate a logo, graphics, or labeling for individual buttons for the PDA. The printing process may further incorporate features, such as text or graphics, that are used by the software on the PDA for a purpose such as simplifying data input or for designating an area on the touch screen for a specific function, such as a help function. The printing or painting processes used on the membrane 110 may be purely decorative and may be for aesthetic purposes only. The printing process may also comprise logos or graphics for the brand identity of the PDA cover. Other processes, such as colorizing the raw material for the membrane 110 or adding other components to the raw material, such as metal flakes or other additives, may be used to change the optical features of the membrane 110.

The optical performance of the membrane 110 may be changed or enhanced by changing the texture of the area of the touch screen. For example, the membrane may be frosted on the outside to hide scratches or may be imprinted with a lens or other features that change the optical characteristics of the membrane 110. The membrane 110 may have optical features that are used in conjunction with the software of the PDA. For example, all or a portion of the membrane may comprise a lens that magnifies an image to a user. When the user touches the image on the membrane 110 and the touch is transferred to the touch screen, the software in the PDA may have to compensate for the positional differences between the image and actual area that was touched by the user. In another example, if a specific portion of the membrane 110 had a specific optical characteristic, the software of the PDA may be constructed to display a specific graphic for the area for an intended effect.

The membrane 110 in the present embodiment has a recessed portion 120 and a raised portion 122. The recessed portion 120 may be adapted to press flat against the touch screen area of a specific PDA. The raised portion 122 may be adapted to fit over an area of the specific PDA where several buttons are located.

The raised portion 122 allows the user to operate the buttons on the PDA. The raised portion 122 is adapted such that the buttons on the PDA are easily operated through the protective membrane 110. The raised portion 122 may have special features to aid the user in pressing the buttons. For example, the raised portion 122 may comprise a dimpled area for the user's finger located directly over the button. Further, a feature to aid the user may comprise a section of membrane 110 defined by a thinner area around the section, enabling the user to more easily deflect the section of membrane over the button. The area of thinner material may comprise a large section or a thin line. Further, tactile elements, such as small ribs or bumps may be incorporated into the membrane 110 in the area of the buttons so that the user has a tactile sensation that the user's finger is over the button. The tactile element may be particularly effective if the button was a power switch, for example, that turned on the PDA.

The configuration of the membrane 110 may be unique to each style or model of PDA, however, the front case 102 and rear case 104 may be used over a variety of PDAs. In the present embodiment, the changeover from one PDA variety to another is accomplished by replacing the membrane 110 without having to change any other parts. The present embodiment may therefore be mass-produced with the only customizable area being the membrane 110 to allow different models of PDAs to be used with a certain front case 102 and rear case 104.

The hand strap 112 in the present embodiment allows the user to hold the embodiment 100 securely in his hand while using the PDA. The hand strap 112 may be constructed of a flexible material, such as rubber or cloth webbing, and may have an adjustment, such as a buckle, hook and loop fastener, or other method of adjustment. In other embodiments, a hand strap may be a rigid plastic handle, a folding handle, or any other method of assisting the user in holding the embodiment. Further, the embodiment may be adapted to be fix-mounted to another object, like a piece of machinery, a wall, or any other object. A fix-mounted embodiment may have other accoutrements adapted for a fixed mount applications, such as receptacles for a stylus adapted to a fix-mount, specialized electrical connections, features for locking the PDA inside the case to prevent theft, or designs specifically adapted to shed water when rained upon.

Figure 2:
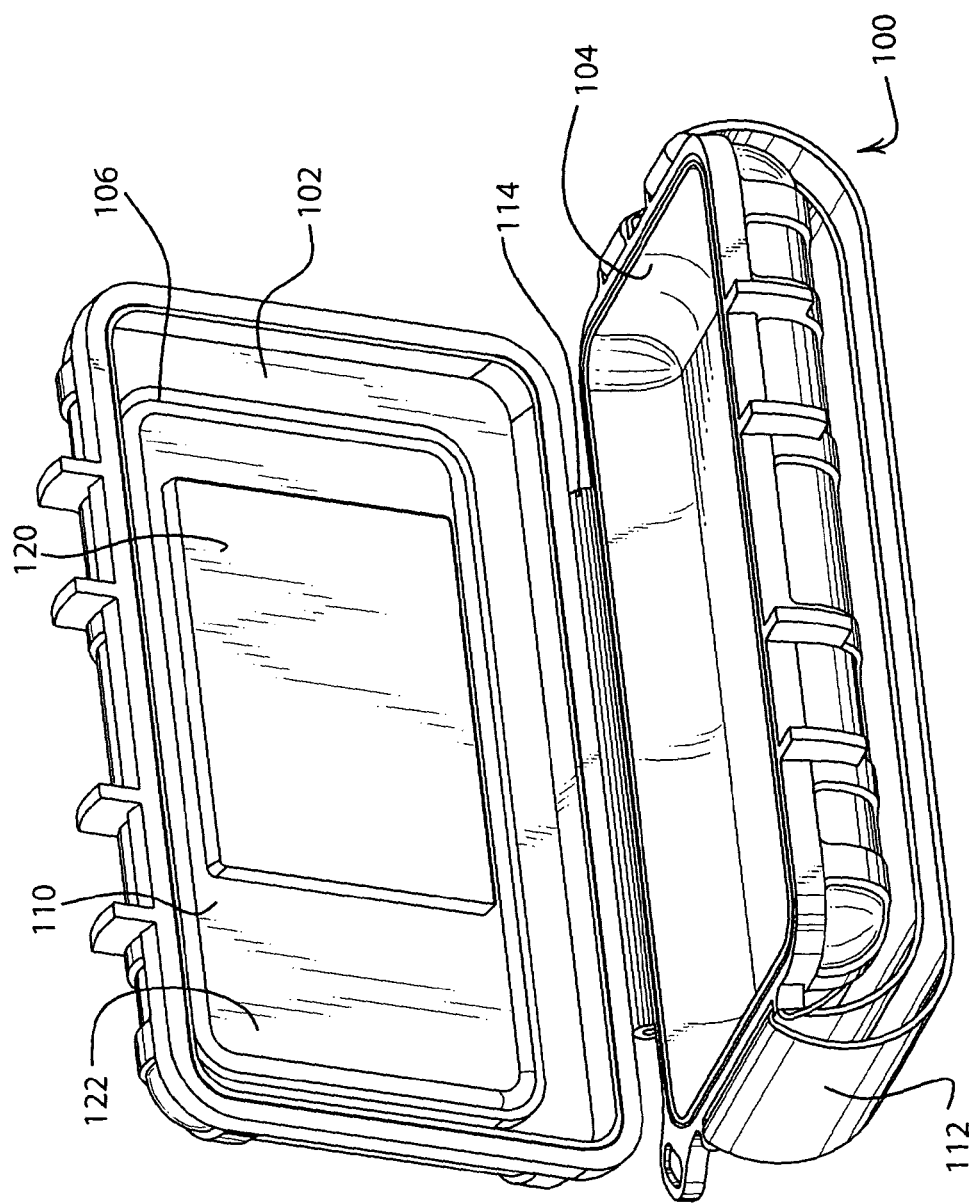
FIG. 2 is a perspective view of an embodiment of the invention shown in the open position.

FIG. 2 illustrates a perspective view of the embodiment 100 shown in an open position. The front case 102 and rear case 104 are shown open about the hinge 114. Membrane 110 is shown installed into gasket 106, and the recessed portion 120 and raised portion 122 of membrane 110 is illustrated looking from the inside of the case. The clasp mechanisms are not shown in this illustration. Hand strap 112 is shown attached to rear case 104.

Figure 3:
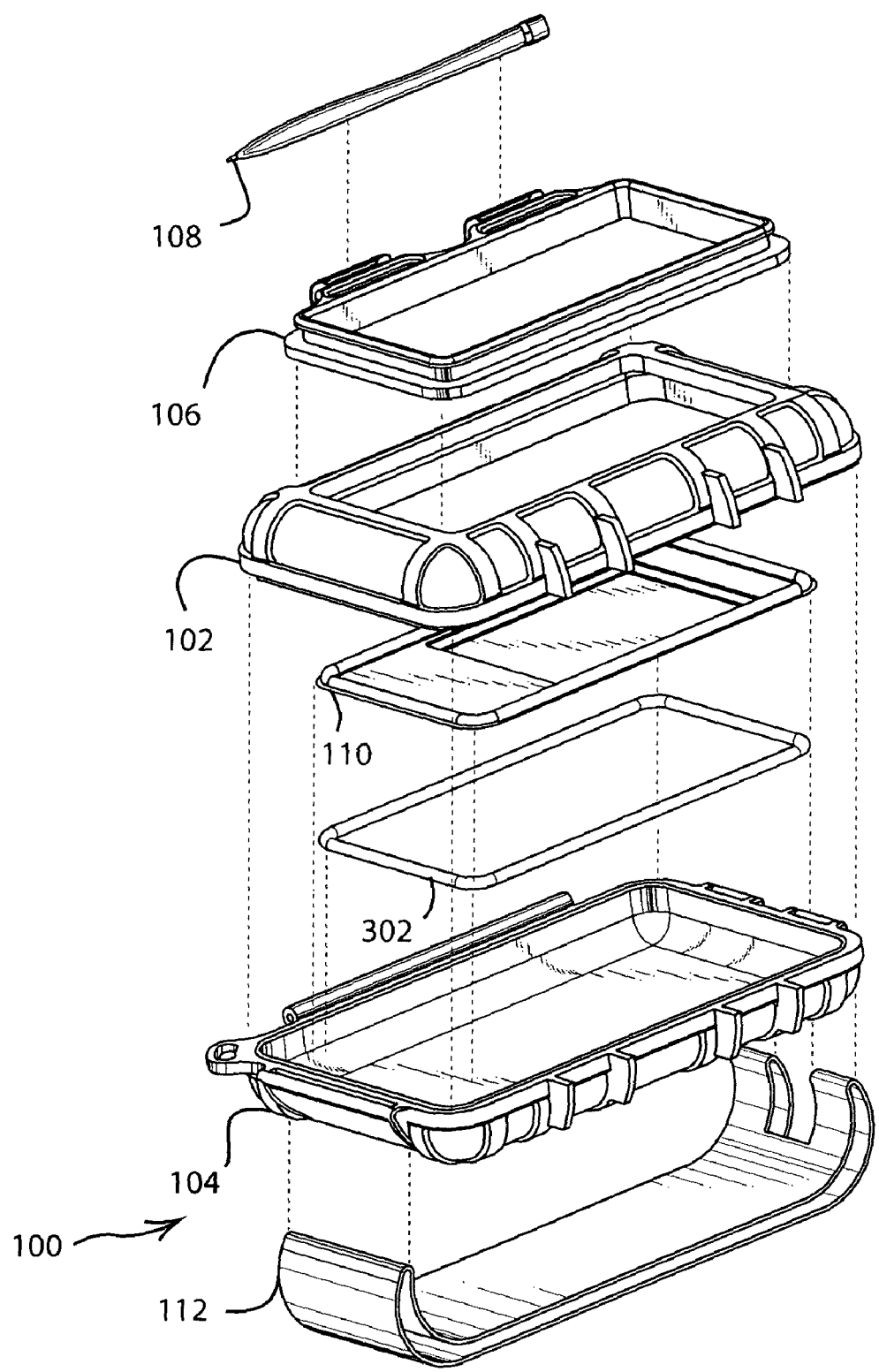
FIG. 3 is a perspective view of an embodiment of the invention shown in an exploded state.

FIG. 3 illustrates a perspective view of the embodiment 100 shown in an exploded state. The hand strap 116 attaches to the rear cover 104. The overmolded grommet 106 holds the stylus 108 and is attached to front cover 102. The membrane 110 attaches to the grommet 106 and is held in place with an o-ring 302.

Figure 4:
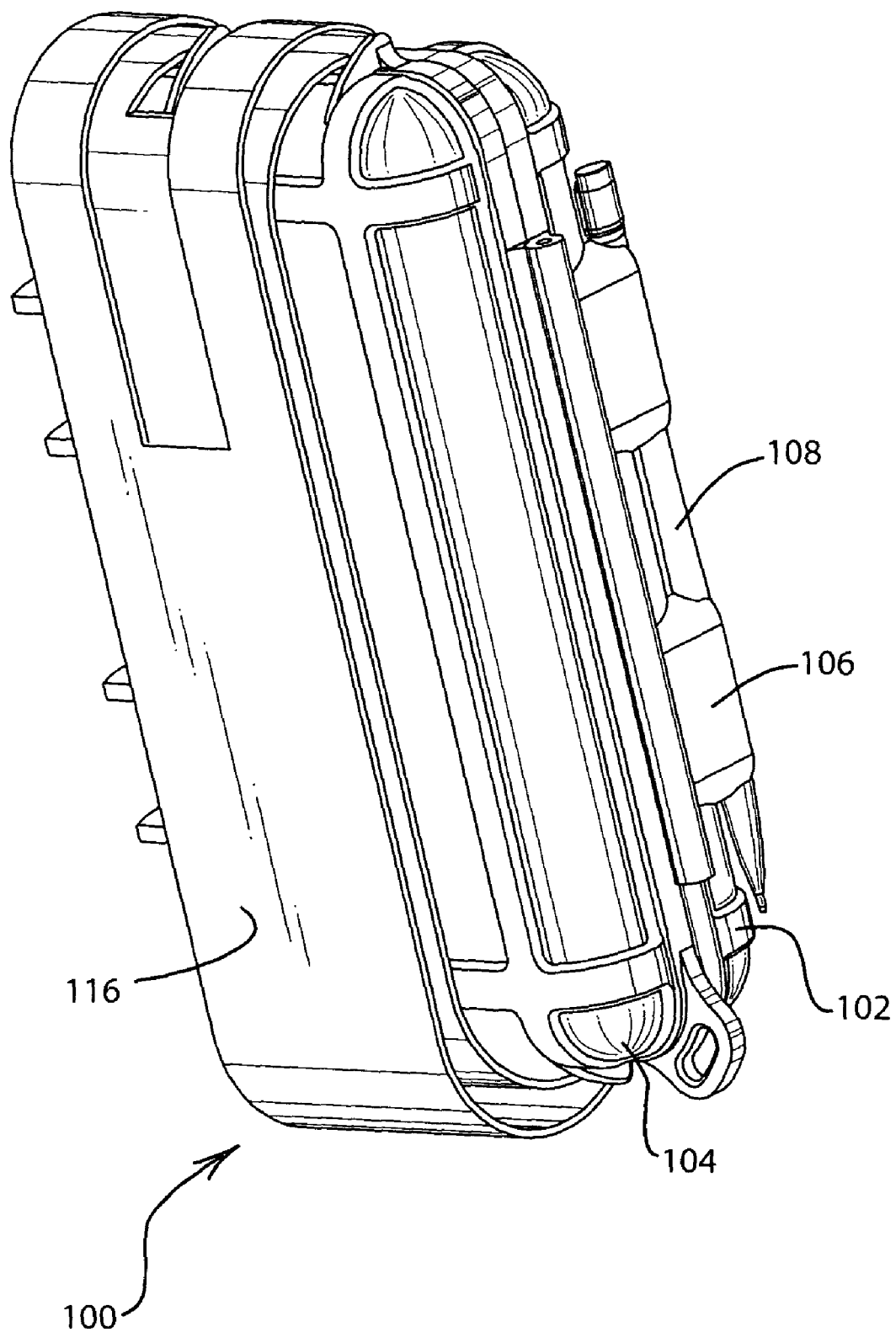
FIG. 4 is a perspective view of an embodiment of the invention shown from the rear.

FIG. 4 illustrates a perspective view of the embodiment 100 shown from the rear. The hand strap 116 is shown, along with rear cover 104 and front cover 102. The stylus 108 is shown inserted into the overmolded grommet 106.

Figure 5:
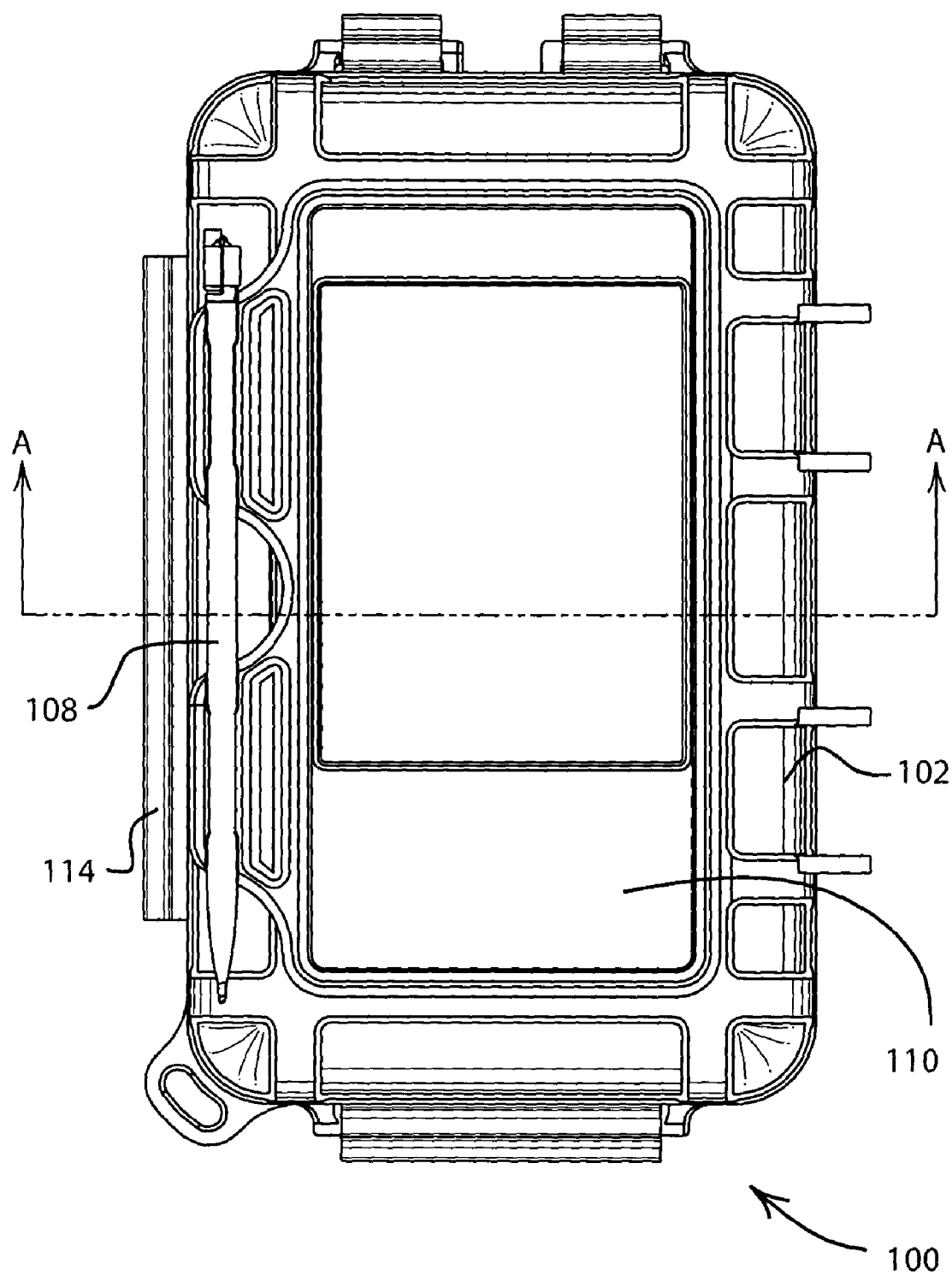
FIG. 5 is a front view of an embodiment of the invention, showing a section line.

FIG. 5 illustrates a top view of the embodiment 100. The front cover 102, membrane 110, stylus 108, and hinge 114 are all visible.

Figure 6:
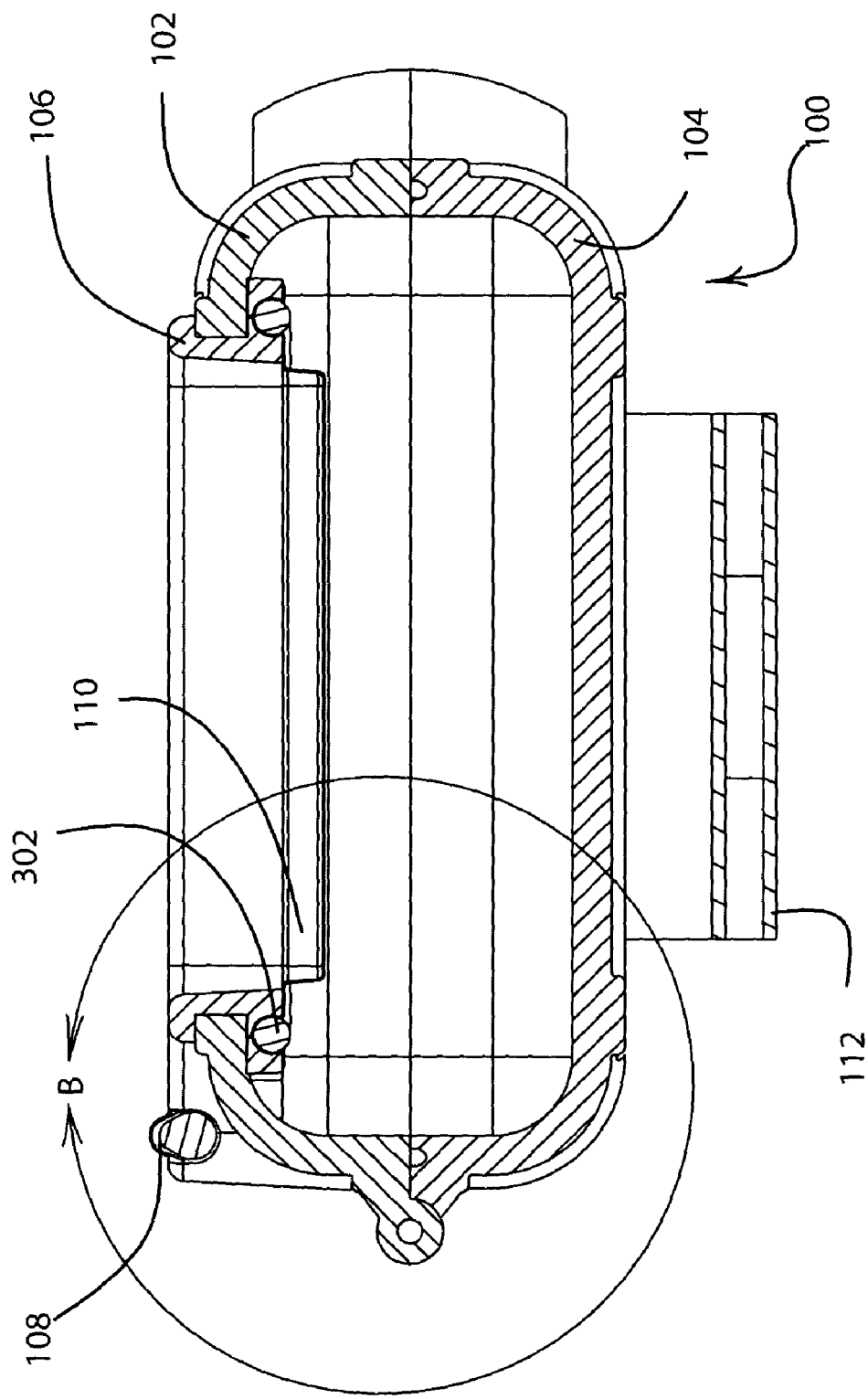
FIG. 6 is a section view of an embodiment of the invention.

FIG. 6 illustrates a section view of the embodiment 100 taken through the section line shown in FIG. 5. The front cover 102, rear cover 104, overmolded gasket 106, stylus 108, membrane 110, hand strap 112, and o-ring 302 are all shown hatched in this view.

Figure 7:
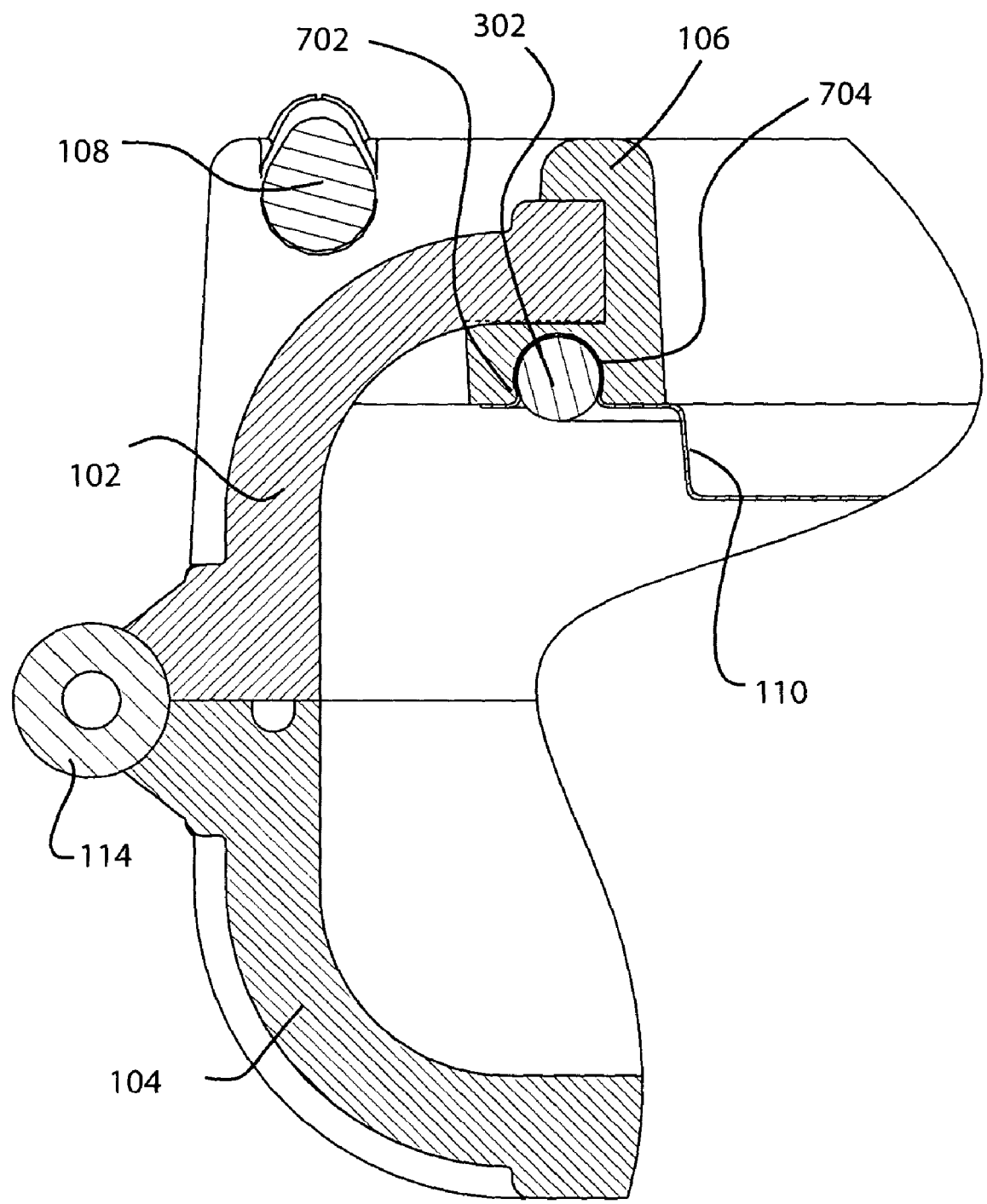
FIG. 7 is a detailed view of a section shown in FIG. 6.

FIG. 7 illustrates a detail view of the embodiment 100 shown in FIG. 6. Front case 102 and rear case 104 are joined at hinge 114. Overmolded gasket 106 traps membrane 110 and o-ring 302 locks membrane 110 in place. Overmolded gasket 106 may be formed by molding thermoplastic polymerized rubber over the front cover 102.

The replacement of the membrane 110 is accomplished by removing o-ring 302, pushing the membrane 110 from the overmolded gasket 106, snapping a new membrane 110 into place, and replacing the o-ring 302. The ease of replacement of the present embodiment allows a user to quickly replace a damaged membrane 110, allows a user to upgrade their case to a newer model PDA, and may allow a user to select from various membranes 110 for the particular application. One embodiment may have a single case packaged with a small variety of several types of membranes 110. In such an embodiment, the user may purchase the packaged set, select the membrane 110 that suits the user's particular PDA, and install the selected membrane 110 with ease.

The protective cover of the present invention may have direct connections through the cover for connecting through the case. Such a connection is known as pass through. The connections may be for power, communication, heat dissipation, optical transmissions, mechanical motion, or other reasons.

Electrical connections may require an insulated metal conductor from the PDA through the wall of the protective cover so that a flexible cable may be attached or so that the PDA in its protective case may be placed in a cradle for making the electrical connection. Inside the protective cover, the electrical connections may be made with a flexible cable that is plugged into the PDAs electrical connector before the PDA is secured in the protective cover. Alternatively, a fixed connector may be attached to the protective cover and the PDA is slid into contact with the fixed connector. Another embodiment may be for a compliant, yet fixed mounted electrical connector to be rigidly mounted inside the protective cover. A compliant, yet fixed mounted electrical connector may comprise spring loaded probes, commonly referred to as pogo pins. Another embodiment may comprise spring fingers that engage the PDAs electrical contacts. On the outside of the protective cover, the electrical contacts may be terminated into a fix-mounted connector adapted to receive a cable from a computer. The connector may be designed to receive a cable that plugs directly into the PDA or it may be adapted to receive a different connector. Further, the electrical connection to the PDA may be permanently attached to a cable that extends out of the protective cover. Another embodiment may be to have a small trap door that opens in the protective cover to allow access to the electrical connections. While the trap door exposes the PDA to the elements the cover is designed to protect against, a direct electrical connection may eliminate a potential cabling connection problem. Connections for fiber optics can be handled in similar fashions as the electrical connections. An embodiment with a power connection may comprise the use of inductive coils located in proximity to each other but on opposite sides of the protective cover. Those skilled in the art of may devise other embodiments for connecting through the protective cover without deviating from the scope and intent of the present invention.

Through the air communications, such as infrared and over the air radio frequency (RF) communications may pass through the protective cover. The material for the front case 102 and rear case 104 may be selected to be clear plastic, such as polycarbonate. The infrared transceiver of the PDA can communicate through a clear plastic case to another infrared transceiver outside of the case. Further, the appropriate selection of material for the protective case can thereby enable various RF transmissions, such as cellular phone communications or other wireless communication protocols.

An infrared transmission through the protective case of an embodiment of the invention may be accomplished by making the entire protective case out of a clear material. Alternatively, a selected area of the protective case may be clear while the remainder of the case is opaque. The selected area may be constructed of a separate piece that allows the infrared light through the protective case. Alternatively, the selected area may be constructed of a portion of the protective case that manufactured in a way so as not to be opaque, such as selectively not painting or plating the area of a plastic protective case. Further, the clear material through which the transmission occurs may be tinted in the visual spectrum but be translucent or at least partially transparent in the infrared spectrum of the device.

A protective case may allow RF transmissions to and from the PDA while the case is closed. Such a case may be constructed of a non-metallic material. In some embodiments, the material of the protective case may be tuned to allow certain frequencies to pass through the protective cover and tune out other frequencies, through loading the material used in the protective cover with conductive media or through varying the thickness of the case and other geometries of the case in the area of the PDA transmission and reception antenna.

In a different embodiment, it may be desirable to shield the PDA from outside RF interference. In this case, the protective cover may be a metallic construction or may be plastic with a metallized coating. Further, membrane 110 may have a light metallized coating applied so that membrane 110 is slightly or fully conductive. An application for such an embodiment may be the use of the PDA in an area of high RF noise that may interfere with the operation of the PDA, or conversely, the use may be in an area that is highly susceptible to external RF interference and the PDAs RF noise may be interfering with some other device.

The PDA may be equipped with a camera or other video capture device. A protective cover may have provisions to allow a clear image to be seen by the video capture device through the case. Such provisions may include an optically clear insert assembled into the protective case. Other embodiments may have a sliding trap door whereby the user of the PDA may slide the door open for the camera to see. Additionally, other embodiments may comprise a molded case that has an optically clear lens integrally molded. Such an embodiment may be additionally painted, plated, or overmolded, with the lens area masked so that the painting, plating, or overmolding does not interfere with the optics of the lens.

An optically clear area may be used for a barcode scanner portion of a PDA to scan through the case to the outside world. In such an embodiment, a barcode scanner may be protected from the elements while still maintaining full functionality in the outside world.

The PDA may have indicator lights that indicate various items, such as power, battery condition, communication, and other status items. The indicator lights may be in positions on the PDA that are not readily viewable through the protective membrane 110. The indicator lights may be made visible through the protective case by using light pipes that transmit the light from the PDAs status light to the outside of the protective case. Such light pipes may be constructed of clear or tinted plastic, or other translucent or semi-transparent material. The light pipes may be formed as an integral feature to the protective case or may be separate parts that are formed separately and assembled to the protective case.

The PDA may have a speaker or other element that makes noise and/or the PDA may have a microphone for receiving audio signals. The speaker may be an audio quality device for reproducing sound or it may be a simple buzzer for indicating various functions of the PDA. The microphone may be an audio quality device or it may be a low performance device. Special provisions may be made for transmitting sound through a protective case. Such provisions may range from a single hole in the case to a tuned cavity that would allow sound to pass through with minimum distortion. Other embodiments may include a transmissive membrane adapted to allow sound to pass through the protective case with a minimum of distortion. Such membranes may be located near the speaker and microphone elements of the PDA. Such membranes may be watertight membranes known by the brand name Gore-Tex.

The PDA may generate heat during its use and provisions for dissipating the heat may be built into the protective cover. A heat-dissipating device may be integral to the protective cover or may comprise one or more separate parts. For example, a metallic protective cover may be adapted to touch the PDA in the area of heat generation and conduct the heat outwardly to the rest of the protective cover. The protective cover may thereby dissipate the heat to the external air without overheating the PDA. In another example, a separate heat sink may be applied to the PDA and allowed to protrude through a hole in the protective cover. The heat sink may thereby transfer the heat from the PDA to the ambient environment without overheating the PDA. The heat sinks may be attached to the PDA with a thermally conductive adhesive. Other embodiments may include vent holes for heat dissipation and air circulation.

The PDA may have a button that may not be located underneath the membrane 110. An embodiment may include a flexible, pliable, or otherwise movable mechanism that may transmit mechanical motion from the outside of the case to a button on the PDA. Such an embodiment may have a molded dimpled surface that is pliable and allows a user to activate a button on a PDA by pressing the dimpled surface. Another embodiment may have a rigid plunger that is mounted on a spring and adapted to transmit the mechanical movement from the exterior of the case to a button on the PDA. The buttons on the PDA may be located on any side of the PDA and an embodiment of a case may have pliable areas adapted to allow the user to press buttons that are not on the front face of the PDA.

Figure 8:
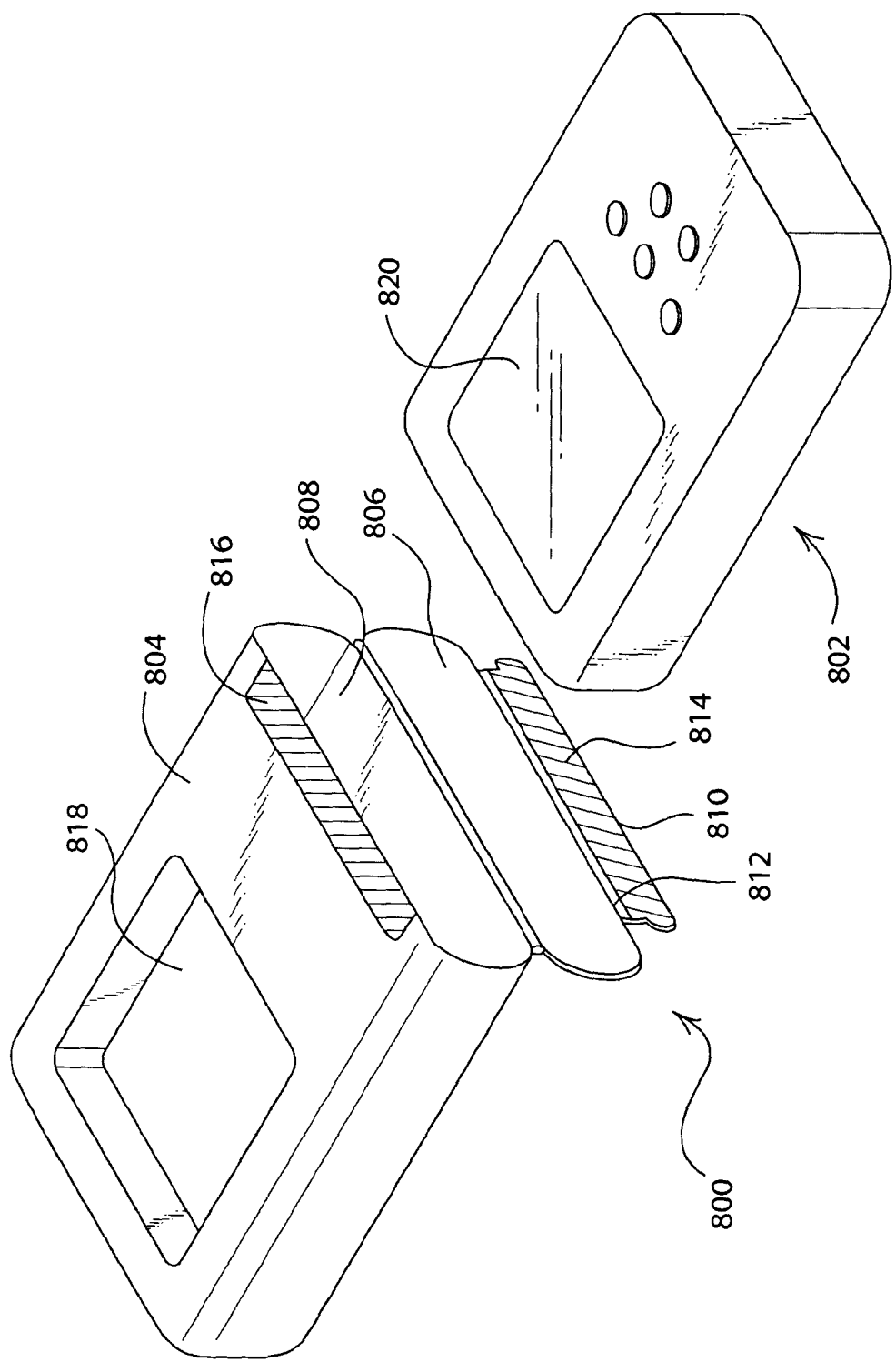
FIG. 8 is a perspective view of another embodiment comprising a single piece encapsulating cover.

FIG. 8 is an illustration of embodiment 800 of the present invention wherein the PDA 802 is encapsulated by a protective cover 804. The installation of the PDA 802 is to slide PDA 802 into the opening 808, then fold door 806 closed and secure with flap 810, which is hinged along line 812. Areas 814 and 816 may comprise a hook and loop fastener system or other fastening device. Recessed area 818 is adapted to fit against touch screen 820 of PDA 802.

Embodiment 800 may be comprised of a single molded plastic part that may be very low cost. As shown, embodiment 800 may not be completely weathertight, since the door 806 does not completely seal the enclosure. However, such an embodiment may afford considerable protection to the PDA 802 in the areas of dust protection, scratch protection, and being occasionally rained upon. Further, the low cost of the embodiment 800 may be changed often during the life of the PDA 802.

Embodiment 800 may have custom colors, logos, or designs that allow a user to personalize their PDA with a specific cover that is suited to their mood or tastes. The colors, logos, and designs may be integrally molded into the cover 804. Alternatively, different colors, logos, and designs may be applied in a secondary operation such as printing, painting, plating, or other application process.

Figure 9:
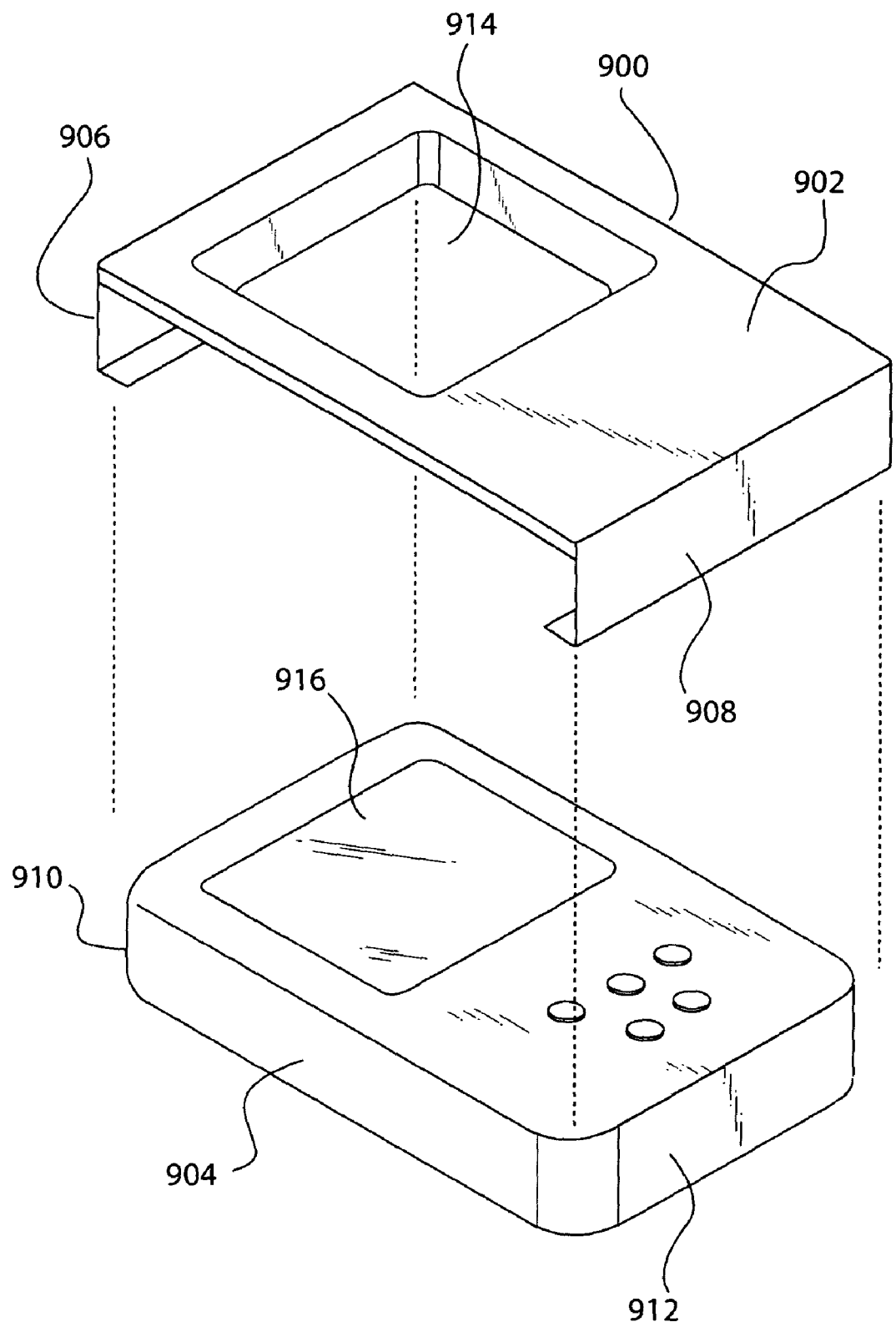
FIG. 9 is a perspective view of a third embodiment comprising a non-encapsulating snap over cover.

FIG. 9 is an illustration of embodiment 900 of the present invention wherein a decorative cover 902 is snapped over a PDA 904. The ends 906 and 908 snap over the PDA ends 910 and 912 as an attachment mechanism for cover 902 to PDA 904. Recessed area 914 is adapted to fit against touch screen 916

Embodiment 900 may be a cover for decorative purposes only, or may be for protective purposes as well. Cover 902 may be emblazoned with logos, designs, or other visual embellishments to personalize the PDA 904. The colors, logos, and designs may be integrally molded into the cover 904. Alternatively, different colors, logos, and designs may be applied in a secondary operation such as printing, painting, plating, or other application process.

Embodiment 900 may be attached by snapping the cover 902 onto PDA 904. Special provisions in the case of PDA 904 may be provided for a snapping feature of cover 902, or cover 902 may be adapted to hold onto PDA 904 without the use of special features in PDA 904.

The features used to secure cover 902 to PDA 904 may be any mechanism whereby the cover 902 can be secured. This includes snapping, clamping, fastening, sliding, gluing, adhering, or any other method for securing two components together.

Figure 10:
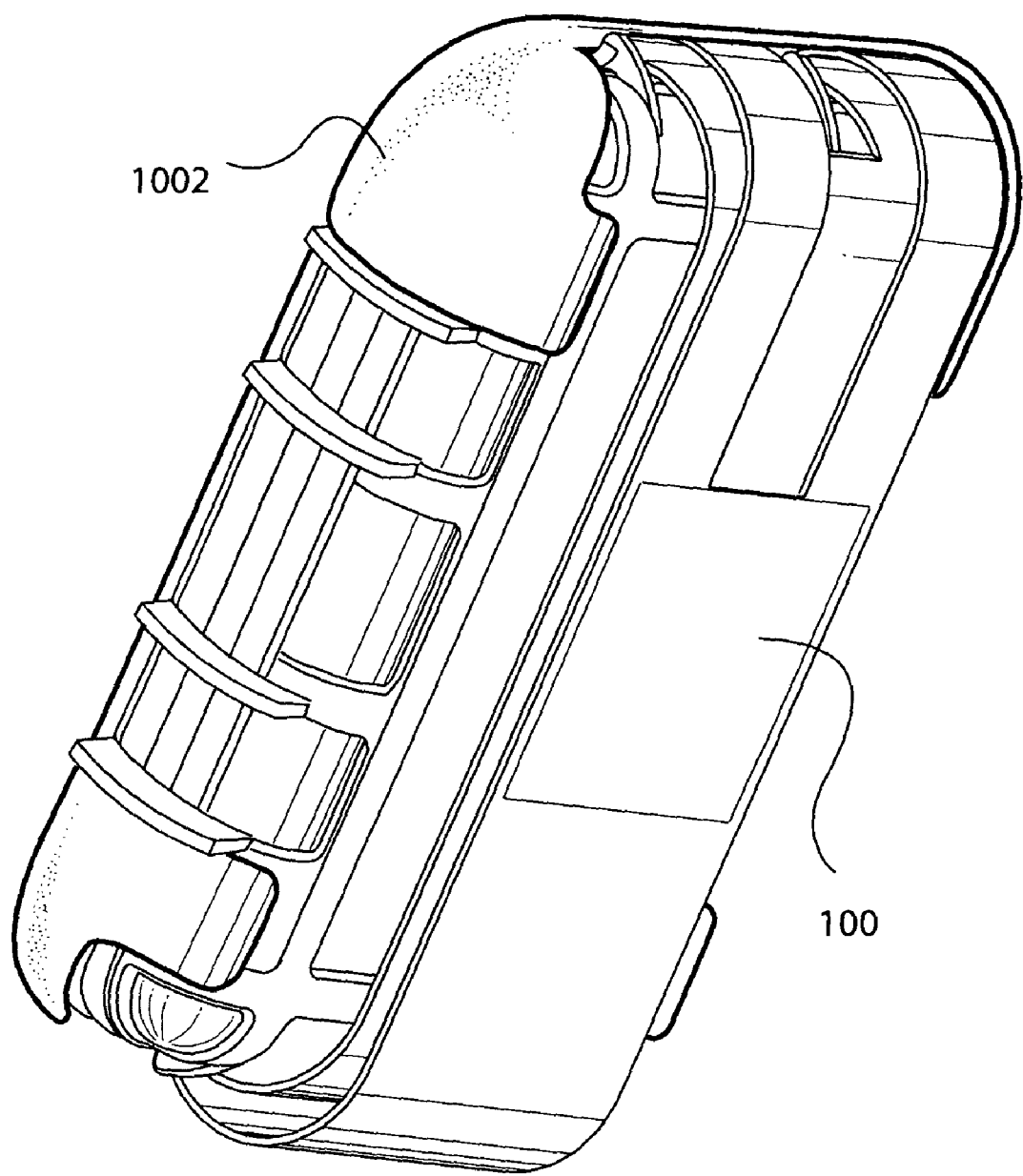
FIG. 10 is a perspective view of an embodiment that comprises a belt clip.

FIG. 10 illustrates a perspective view of an embodiment of a receiver 1002 for holding the protective case 100. The protective case 100 is held into receiver 1002 in such a manner that the touch screen display is facing into the receiver 1002, to afford the touch screen display with protection.

Figure 11:
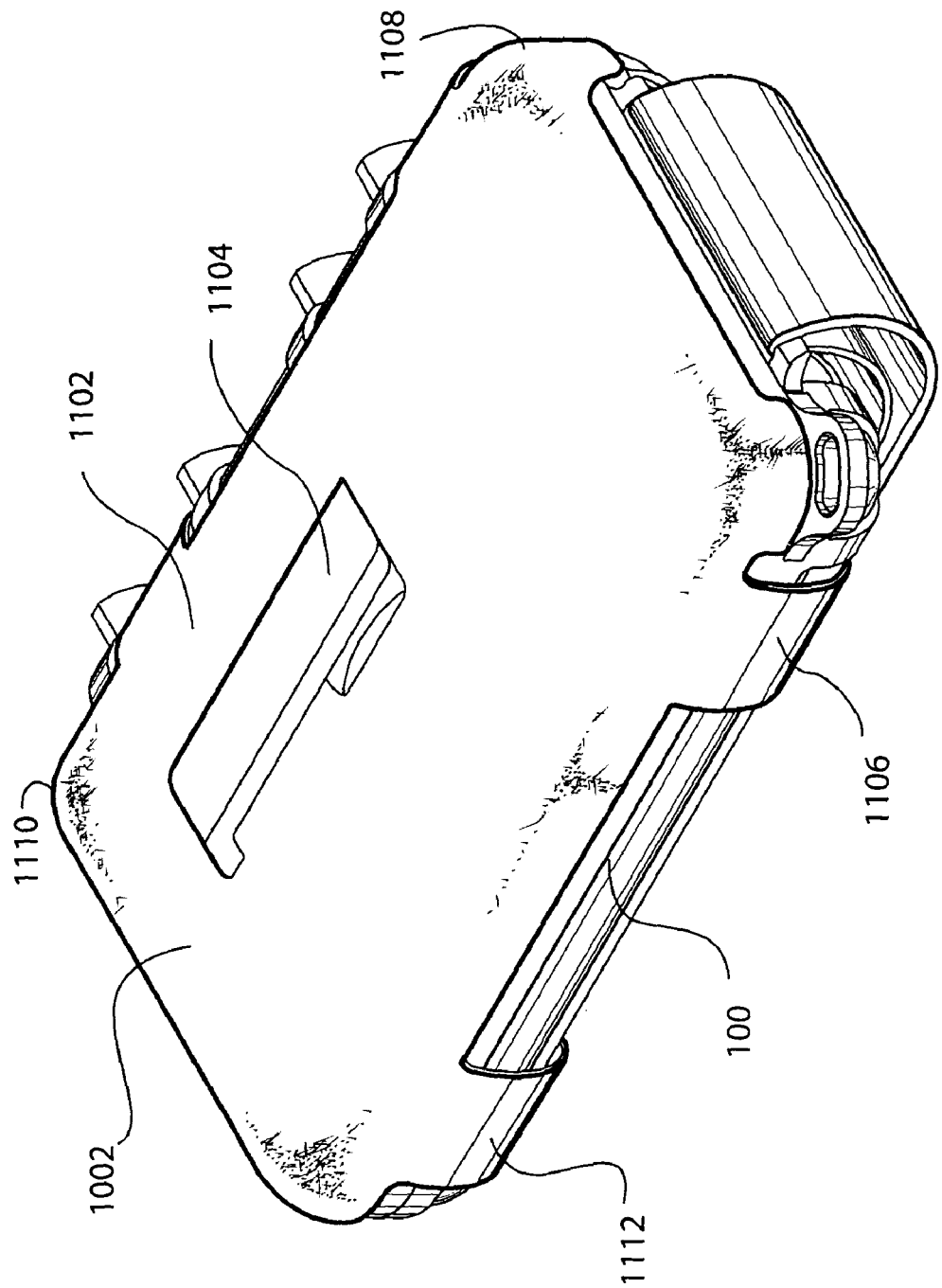
FIG. 11 is a second perspective view of an embodiment that comprises a belt clip.

FIG. 11 illustrates a perspective view of the embodiment of a receiver 1002 shown from the opposite side as FIG. 10. Receiver 1002 is comprised of a back 1102, a belt clip mechanism 1104, and four clip areas 1106, 1108, 1110, and 1112. The protective case 100 is placed into the receiver 1002 by inserting one end into the receiver, then rotating the protective case 100 into position such that the snapping action of clip areas 1106, 1108, 1110, and 1112 are engaged to hold protective case 100 securely.

Receiver 1002 may be adapted to clip onto a person's belt or may be adapted to be mounted on a wall or other location where the PDA may be stored. The orientation of the protective case 100 is such that the touch screen element of the PDA is protected during normal transport and storage, since the touch screen interface is facing the back 1102 of the receiver 1002.

Receiver 1002 may be made of compliant plastic that allows the clip areas 1106, 1108, 1110, and 1112 to move out of the way and spring back during insertion or removal of the protective case 100. In the present embodiment, receiver 1002 may be constructed of a single part. In alternative embodiments, receiver 1002 may be constructed of multiple parts and of multiple materials, such as a metal back with spring loaded clips. In other embodiments, special features may be included in the protective case 100 where the receiver 1002 may engage a special feature for securing the protective case 100.

Figure 12:
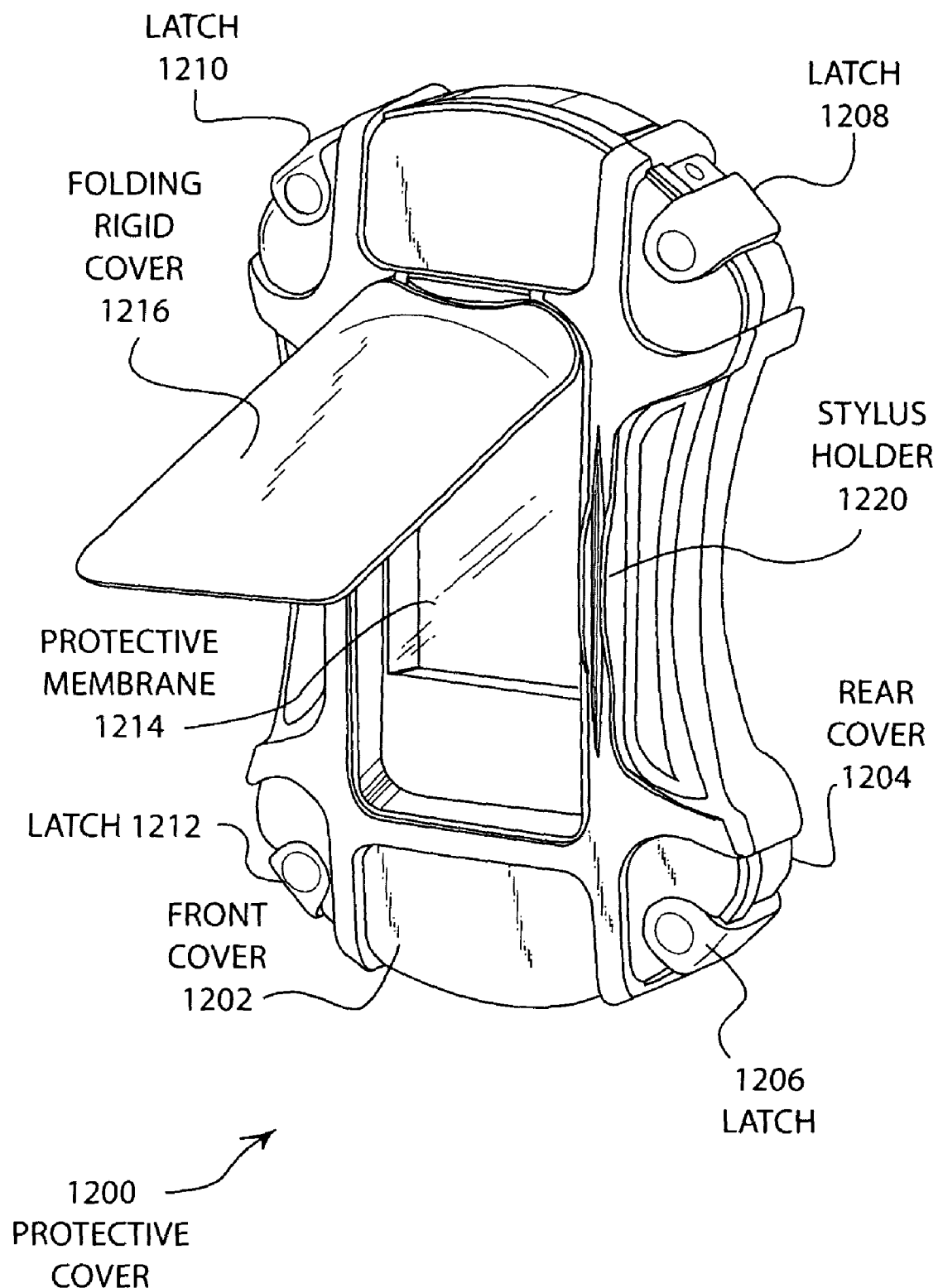
FIG. 12 is a perspective view of another embodiment of the present invention of a protective cover for a PDA or other device.

FIG. 12 illustrates an embodiment 1200 of the present invention of a protective cover for a PDA or other device. A rigid front cover 1202 and a rigid rear cover 1204 are held together with a series of latches 1206, 1208, 1210, and 1212. The protective membrane 1214 protects the touchscreen of the enclosed PDA. A folding rigid cover 1216 operates as a rigid shield to prevent the membrane 1214 from any damage. The stylus holder 1220 is formed from an overmolded flexible material in which the membrane 1214 is mounted.

Embodiment 1200 illustrates yet another embodiment of the present invention wherein a rigid protective cover may be used to contain and protect an electronic device, but provide full usable access to a touchscreen. The protective membrane 1214 and case may be watertight in some embodiments.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A protective enclosure for a touch screen device having a touch screen comprising:
    a shell that is capable of enclosing and substantially surrounding said touch screen device, said touch screen device being a separate unit from said protective enclosure, said shell being adapted to insert and remove said touch screen device by hand, said shell being substantially submersibly watertight, substantially rigid and substantially crush-resistant, said shell being larger than said touch screen device so that there is a gap between an outer surface of said touch screen device and an inner surface of said shell so that said shell may flex when subjected to a crushing force without transmitting said force directly to said touch screen device, said shell having an elevated protective rim substantially surrounding a perimeter of said touch screen of said touch screen device so that when said touch screen device is disposed in said enclosure, said touch screen of said touch screen device is recessed with respect to said protective rim of said shell so that said elevated protective rim protects said touch screen from deflection and breakage by contact with an object that is larger than said perimeter of said protective rim; and
    a flexible protective membrane that is integrally fixed on said shell so that said flexible protective membrane is disposed over said touch screen of said touch screen device when said touch screen device is disposed in said enclosure, said flexible protective membrane having a back side that has a substantially planar smooth surface that is adjacent to said touch screen of said touch screen device when said touch screen device is disposed in said enclosure so that tactile inputs on a front side of said flexible protective membrane are communicated to said touch screen through said flexible protective membrane, said flexible protective membrane being at least partially transparent such that said touch screen is visible through said flexible protective membrane so that said touch screen is capable of displaying and capturing information through said flexible protective membrane.

2. The protective enclosure of claim 1 wherein said shell is made of a rigid plastic that is substantially devoid of soft PVC, thermoplastic elastomers, and thermoplastic polyurethanes, so that said shell is substantially crush-resistant.

3. The protective enclosure of claim 1 wherein said shell is formed from polycarbonate having sufficient thickness to make said shell substantially crush-resistant.

4. The protective enclosure of claim 1 wherein said shell is made of a rigid plastic that has a flexural modulus of at least 310 kilopounds per square inch so that said shell is substantially crush-resistant.

5. The protective enclosure of claim 1 further comprising at least one shock-absorbing insert disposed in said gap between said touch screen device and said shell.

6. The protective enclosure of claim 1 wherein said flexible protective membrane is sufficiently thin to transmit smooth strokes from a stylus to said touch screen without interruption of said strokes, said flexible protective membrane being sufficiently smooth and sufficiently firm to prevent said stylus from catching on said membrane.

7. The protective enclosure of claim 6 wherein said shell of said protective enclosure further comprises grip-enhancing structures that enable said protective enclosure to be securely held by hand in slippery conditions.

8. The protective enclosure of claim 6 further comprising at least one recessed area in said front side of said flexible protective membrane, said recessed area disposed to align with at least one predetermined region of said touch screen of said touch screen device when said touch screen device is disposed in said enclosure, said recessed area having a perimeter edge that provides tactile feedback, said recessed area being sufficiently thin so that said tactile inputs are transmitted through said flexible protective membrane to said touch screen of said touch screen device when said touch screen device is disposed in said enclosure.

9. The protective enclosure of claim 8 further comprising textured areas in said front side of said flexible protective membrane, said textured areas providing tactile feedback, said textured areas customized through the incorporation of distinct textures that overlay and correspond to distinct functional areas of said touch screen device.

10. The protective enclosure of claim 9 further comprising printed areas in said flexible protective membrane, said printed areas providing visual feedback, said printed areas customized through the incorporation of distinct printing that corresponds to distinct functional areas of said touch screen device.

11. The protective enclosure of claim 10 further comprising colored areas in said flexible protective membrane, said colored areas providing visual feedback, said colored areas customized through the incorporation of distinct colors that correspond to distinct functional areas of said touch screen device.

12. A method of manufacturing a protective enclosure for a touch screen device having a touch screen comprising:

providing a protective shell that is capable of enclosing said touch screen device, said touch screen device being a separate unit from said protective enclosure, said shell being adapted to insert and remove said touch screen device by hand, said shell being substantially rigid and substantially crush-resistant, said shell being larger than said touch screen device so that there is a gap between an outer surface of said touch screen device and an inner surface of said shell so that said shell may flex when subjected to a crushing force without transmitting said force directly to said touch screen device, said shell having an elevated protective rim substantially surrounding a perimeter of said touch screen of said touch screen device so that when said touch screen device is disposed in said enclosure, said touch screen of said touch screen device is recessed with respect to said protective rim of said shell so That said elevated protective rim protects said touch screen from deflection and breakage by contact with an object that is larger than said perimeter of said protective rim;

providing a compressible gasket that is disposed in a perimeter portion of said shell tat creates a watertight submersible seal;

forming a clamp that clamps two portions of said shell in a closed position so as to compress said compressible gasket when said two portions of said shell are clamped in said closed position so that shell is submersibly watertight;

disposing said gasket in a perimeter area of one portion of said two portions of said shell so that said shell is submersibly watertight when said two portions of said shell are clamped together causing said gasket to be compressed to form a submersibly watertight seal;

providing a flexible protective membrane that is capable of being integrally fixed on one portion of said two portions of said shell so that said flexible protective membrane is disposed over said touch screen of said touch screen device when said touch screen device is disposed in said enclosure, said flexible protective membrane having a back side that has a substantially planar smooth surface that is adjacent to said touch screen of said touch screen device when said touch screen device is disposed in said enclosure so that tactile inputs on a front side of said flexible protective membrane are communicated to said touch screen through said flexible protective membrane, said flexible protective membrane being at least partially transparent such that said touch screen is visible through said flexible protective membrane so that said touch screen is capable of displaying and capturing information Through said flexible protective membrane;

fixing said flexible protective membrane onto said one portion of said two portions of said protective shell so that said flexible protective membrane and said protective shell form a protective enclosure for said touch screen device.

13. The method of claim 12 further comprising:

forming recessed areas in said front side of a flexible protective membrane, said recessed areas disposed to overlay and correspond to functional control areas of said touch screen device.

14. The method of claim 12 further comprising:

printing on predetermined areas of said flexible protective membrane to customize said flexible protective membrane.

15. The method of claim 12 further comprising customizing:

texturing predetermined areas of said flexible protective membrane to customize said flexible protective membrane.

16. The method of claim 12 further comprising customizing:

coloring predetermined areas of said flexible protective membrane to customize said flexible protective membrane.

17. The method of claim 12 wherein said step of forming recessed areas in a front side of a flexible protective membrane is implemented using thermoforming tat enables thin-walled parts as required for precise recessed areas and an extensive choice of patterns, finishes, and textures.

18. The method of claim 12 wherein said step of forming recessed areas in a front side of a flexible protective membrane is implemented using injection molding.

* * * * *

UNITED STATES PATENT AND TRADEMARK OFFICE
Certificate

Patent No. 6,995,976 B2                                                                 Patented: February 7, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Curtis R. Richardson, Fort Collins, CO (US); and Douglas Kempel, Fort Collins, CO (US)

Signed and Sealed this Nineteenth Day of March 2013.

*JINHEE LEE*
*Supervisory Patent Examiner*
*Art Unit 2835*
*Technology Center 2800*